(12) United States Patent
Nelson

(10) Patent No.: US 12,117,038 B2
(45) Date of Patent: Oct. 15, 2024

(54) MULTI-FUNCTIONAL CONNECTOR FOR MODULAR FLOATING PLATFORMS

(71) Applicant: Bruce Nelson, Minneapolis, MN (US)

(72) Inventor: Bruce Nelson, Minneapolis, MN (US)

( * ) Notice: Subject to any disclaimer, the term of this patent is extended or adjusted under 35 U.S.C. 154(b) by 408 days.

(21) Appl. No.: 17/451,433

(22) Filed: Oct. 19, 2021

(65) Prior Publication Data

US 2022/0120301 A1 Apr. 21, 2022

Related U.S. Application Data

(60) Provisional application No. 63/093,565, filed on Oct. 19, 2020, provisional application No. 63/093,592, (Continued)

(51) Int. Cl.
| | |
|---|---|
| *B63B 75/00* | (2020.01) |
| *B63B 7/04* | (2020.01) |
| *B63B 27/14* | (2006.01) |
| *B63B 35/44* | (2006.01) |
| *B63C 1/02* | (2006.01) |
| *B63C 1/04* | (2006.01) |

(Continued)

(52) U.S. Cl.
CPC ............... *F16B 7/02* (2013.01); *B63B 7/04* (2013.01); *B63B 27/143* (2013.01); *B63B 35/44* (2013.01); *B63B 75/00* (2020.01); *B63C 1/02* (2013.01); *B63C 1/04* (2013.01); *B63C 3/00* (2013.01); *E02B 3/064* (2013.01)

(58) Field of Classification Search
CPC . F16B 7/02; B63B 7/04; B63B 27/143; B63B 35/44; B63B 75/00; B63B 35/38; B63C 1/02; B63C 1/04; B63C 3/00; B63C 3/02; E02B 3/064; E02B 3/24
See application file for complete search history.

(56) References Cited

U.S. PATENT DOCUMENTS 3,824,644 A * 7/1974 Stranzinger ............. B63B 35/38
14/27
5,941,660 A * 8/1999 Rueckert ................. B63C 15/00
114/263

(Continued)

FOREIGN PATENT DOCUMENTS

| BR | MU8800046 U2 * | 4/2010 |
| CN | 208199859 | 12/2018 |
| RU | 2531881 C1 * | 10/2014 |

OTHER PUBLICATIONS https://gulfstreamdocks.com/jestski-docks/ (Year: 2020).*
https://gulfstreamdocks.com/gulf-stream-docks-differences/ (Year: 2023).*

*Primary Examiner* — Anthony D Wiest
(74) *Attorney, Agent, or Firm* — Todd R. Fronek; Larkin Hoffman Daly & Lindgren, Ltd.

(57) ABSTRACT

A modular floating platform connector includes a connecting unit with a hollow center chamber that has one or more inside diameters. The chamber may have wall surfaces to secure components to modular floating platforms. The connector may further incorporate one or more external features such as a collar and retaining ribs that engage with the connecting tabs on modular floating platform float modules to securely hold the float modules together and to retain attachment members of accessories, fixtures, structures and other components to modular floating platforms.

25 Claims, 9 Drawing Sheets

Related U.S. Application Data filed on Oct. 19, 2020, provisional application No. 63/093,578, filed on Oct. 19, 2020, provisional application No. 63/093,581, filed on Oct. 19, 2020.

(51) Int. Cl.
  *B63C 3/00* (2006.01)
  *E02B 3/06* (2006.01)
  *F16B 7/02* (2006.01)

(56) References Cited

U.S. PATENT DOCUMENTS

| | | | |
|---|---|---|---|
| 6,526,902 B1* | 3/2003 | Faber | B63C 1/02 |
| | | | 114/263 |
| 7,117,809 B2 | 10/2006 | Lamoureux et al. | |
| 7,213,531 B2* | 5/2007 | Ahern | B63C 1/02 |
| | | | 114/263 |
| 7,225,751 B2* | 6/2007 | Rueckert | B63B 3/08 |
| | | | 114/259 |
| 8,783,199 B2* | 7/2014 | Shih Cion Shen | B63B 35/58 |
| | | | 114/267 |

* cited by examiner

MULTI-FUNCTIONAL CONNECTOR FOR MODULAR FLOATING PLATFORMS

FIELD OF INVENTION

This description relates to securing float modules together in modular floating platforms. More particularly, the description details a connecting device that can be utilized for attaching and securing components and accessories to modular floating platforms.

BACKGROUND

Modular floating platforms have been in use for a number of years and are increasing both in popularity and applications. Current modular floating platforms are constructed with molded plastic float modules that can be interconnected to form a variety of configurations of floating platforms. Modular floating platforms are used by lake home property owners as an alternative to conventional fixed platforms and piers. Modular floating platforms are also used as floating vessel platforms that provide an easy means of storing watercraft out of the water where a boat or other watercraft can be driven on top of the floating platform for dry storage. Additionally, modular floating platforms are also being used in various commercial applications such as floating work platforms where, for example, scaffolding can be placed on the floating platform to access areas under bridges and piers for repairs and maintenance. In all of these applications, it is desirable to secure various add-on components to the floating platform.

Some floating platform modules incorporate attachment points by adding threaded inserts or other attachment structures into the float modules. These structures can require large float modules to be roto-molded. With other floating platform modules, and in particular those that are blow molded, it is impractical or not possible to add threaded insets or other attachment structures to the float modules. In both cases, the limited locations or absence of attachment points limits the ability to secure needed or desirable add-on components to modular floating platforms.

SUMMARY

A modular floating platform connector includes a molded elongated connecting unit with a hollow center chamber that has one or more inside diameters. The chamber may have smooth wall surfaces such as for retaining tubular members of add-on platform components or the chamber may have one or more threaded wall sections for receiving and securing threaded fasteners, such as bolts, threaded rods or threaded pipes, for securing add-on platform components. The chamber may further provide for a section with walls arranged in such a fashion to receive and retain other fastening devices, such as a threaded nut.

BRIEF DESCRIPTION OF THE DRAWINGS

Some embodiments of the invention are illustrated as an example and are not limited by the figures of the accompanying drawings, in which like references may indicate similar elements and which.

DETAILED DESCRIPTION

The terminology used herein is for purposes of describing particular embodiments only and is not intended to be limiting of the description. The present disclosure is considered as an exemplification of the concepts herein described and is not intended to limit the description to the specific embodiments illustrated by the figures or description below.

As modular floating platforms have grown in popularity so too have their uses. In recreational applications it is desirable to attach various accessories to modular floating platforms such as benches, storage racks for kayaks, and swim ladders. In commercial applications, it is desirable to secure fixtures and structures to floating platforms such as scaffolding, guardrails, stanchions, solar panels and the like. In emerging applications, modular floating platforms can be used to erect various structures such as concession stands, cabanas and other "on the water" shelters.

Securing accessories, fixtures and structures to modular floating platforms has been limited and challenging. Components used to construct modular floating platforms include hollow float modules and connectors that are molded out of various plastic materials. In order to retain air tightness, and therefore their buoyancy, it is not feasible to screw or bolt into modular floating platforms as can be done, for example, with a platform or floating platform made out of wood.

Figure 1:
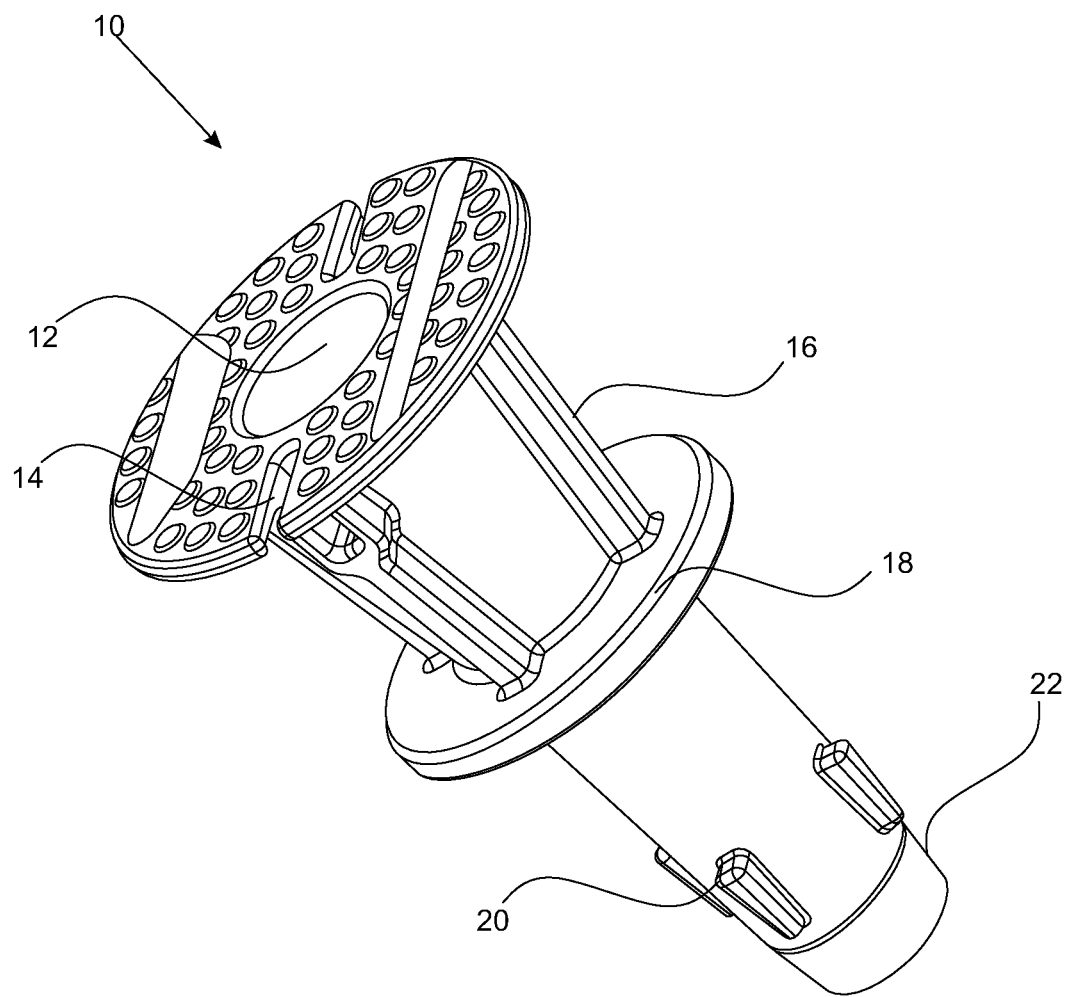
FIG. 1 is a perspective view of one example of a multi-functional floating platform connector.

FIG. 1 illustrates a multi-functional floating platform connector 10. In one embodiment, connector 10 is made of a rigid plastic material such as nylon. The connector 10 has a centrally located internal chamber 12, a head with slots 14 that are used to twist and lock the connector into tabs located on the float modules, strengthening ribs 16 that provide extra structural support to the connector, a collar 18 that rests on top of the float module tabs and provides additional strength, retaining ribs 20 that secure the connector into corresponding float module connecting tabs and a tapered tip 22 that facilitates inserting the connector into the float module connecting tabs.

Figure 2:
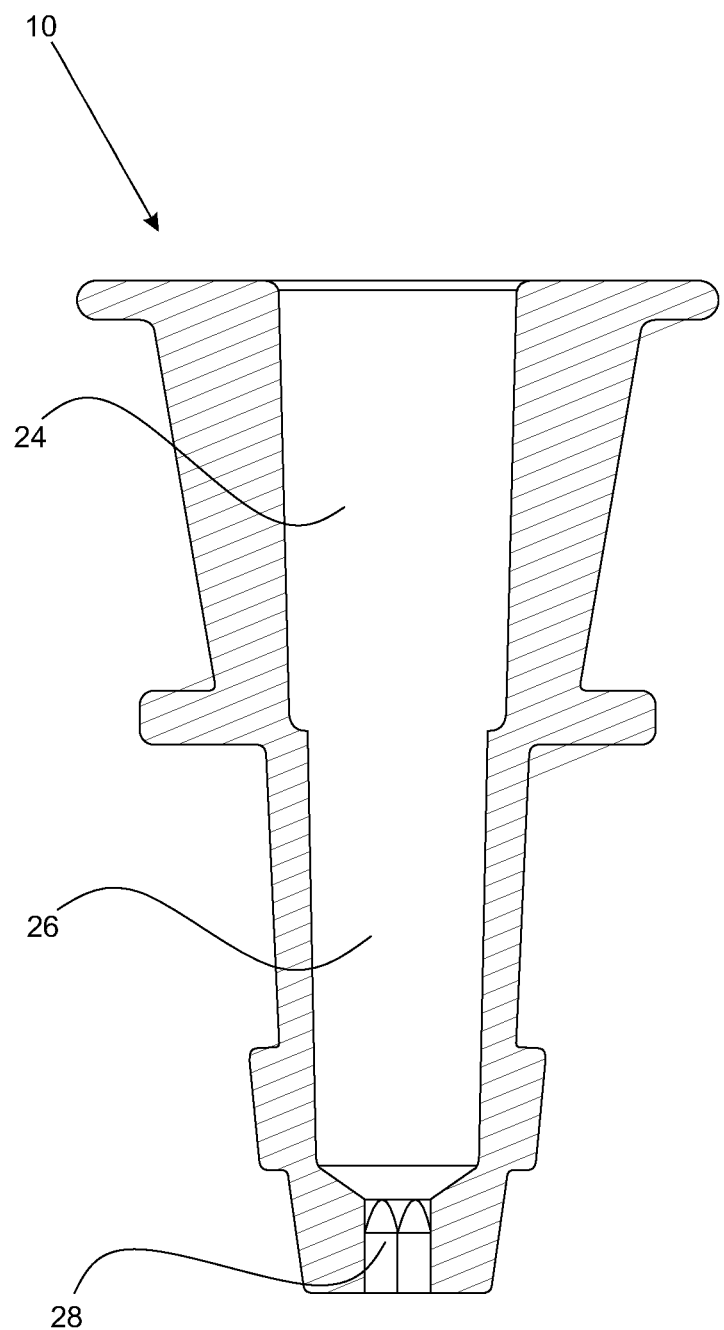
FIG. 2 is a cross-section view of one example of a multi-functional floating platform connector.
Figure 3A:
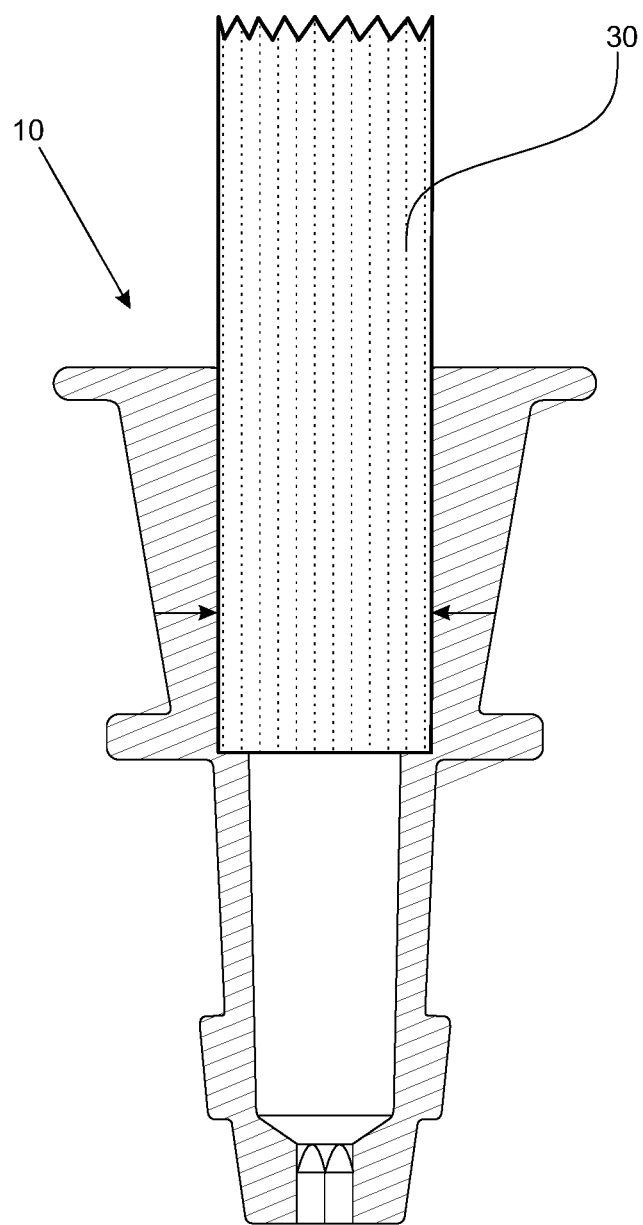
FIG. 3a is a cross-section view of one example of a multi-functional floating platform connector with one size of a tubular member secured thereto
Figure 3B:
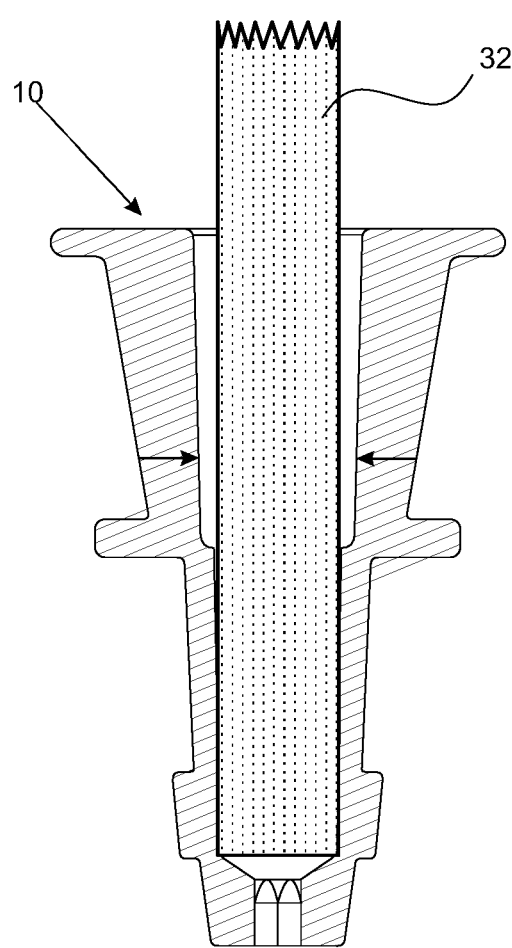
FIG. 3b is a cross-section view of one example of a multi-functional floating platform connector with a second size tubular member secured thereto.
Figure 3C:
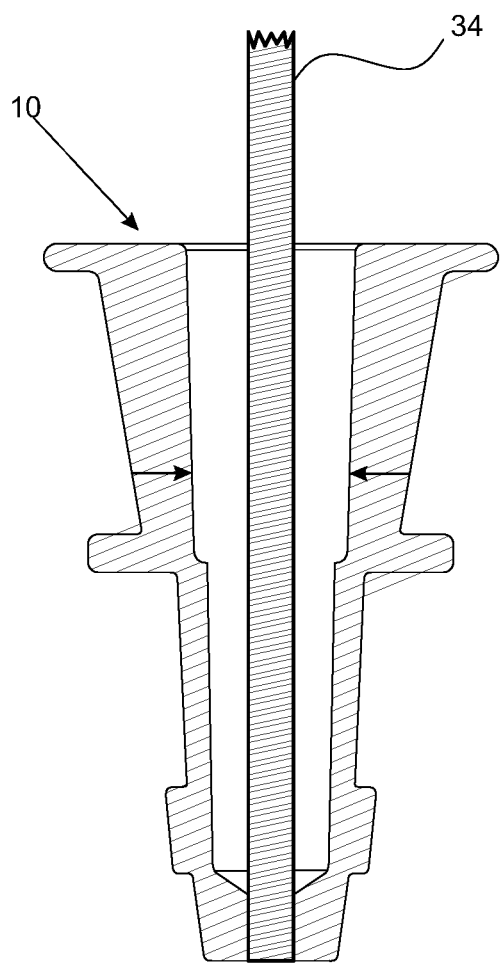
FIG. 3c is a cross-section view of one example of a multi-functional floating platform connector with a threaded member secured thereto.
Figure 4A:
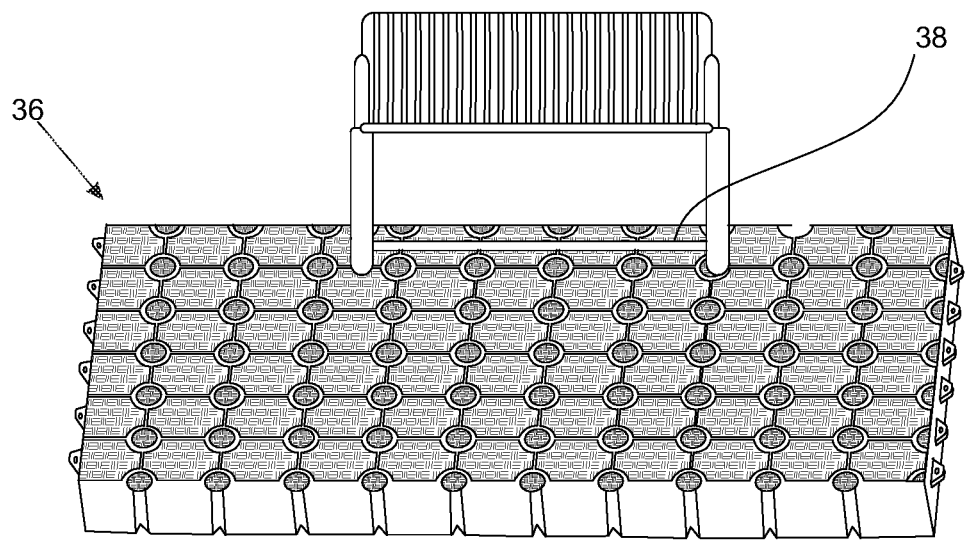
FIG. 4a is a perspective view of one example an add-on accessory secured to a modular floating platform utilizing a multi-functional floating platform connector.
Figure 4B:
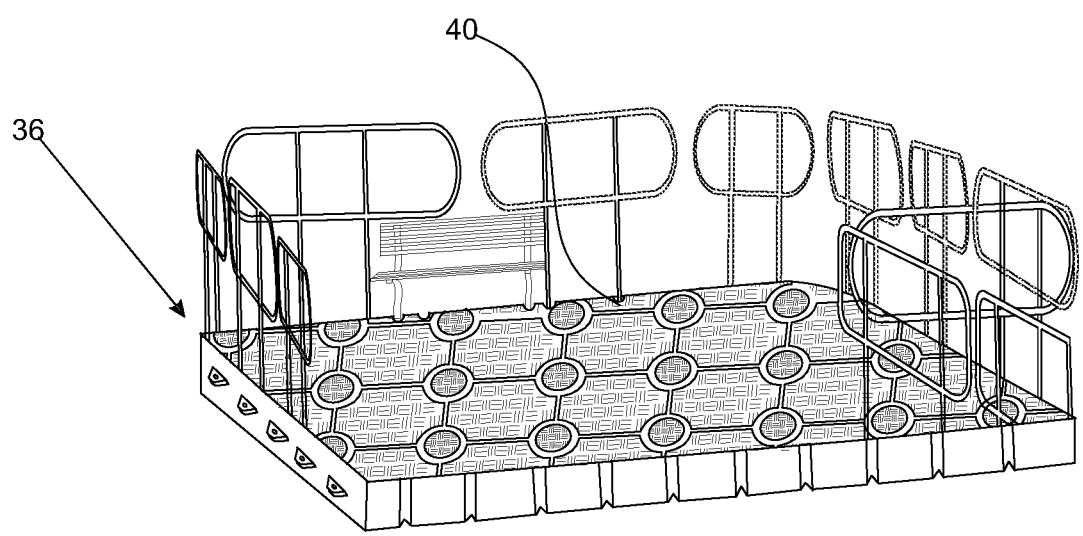
FIG. 4b is a perspective view of one example of a fixture secured to a modular floating platform utilizing a multi-functional floating platform connector.

FIG. 2 is a cross section view of the connector 10 showing the internal chamber 12 of one embodiment of the invention. As illustrated in FIG. 2, the internal chamber 12 of the connector 10 has selected wall diameters 24, 26, and 28 for receiving and retaining various types of attachment members such as those shown in FIGS. 3*a*, 3*b* and 3*c*. The attachment member 30 shown in 3*a* is a section of a tubular member of a certain diameter that could, for example represent the leg of a bench 38 attached to a floating platform assembly 36 that is secured with multi-purpose floating platform connectors as illustrated in FIG. 4*a*. The attachment member shown in FIG. 3*b* is a section of tubular member 32 with a diameter that is smaller than the diameter of the tubular member 30 that could, for example, represent the leg of a handrail 40 that is secured with multi-purpose floating platform connectors as illustrated in FIG. 4*b*. The attachment member 34 shown in FIG. 3*c* is a threaded attachment member that could, for example, represent a bolt that is used to secure a foundation board 42 for a structure, such as a structure as illustrated in FIGS. 4*c* and 4*d*.

Figure 5:
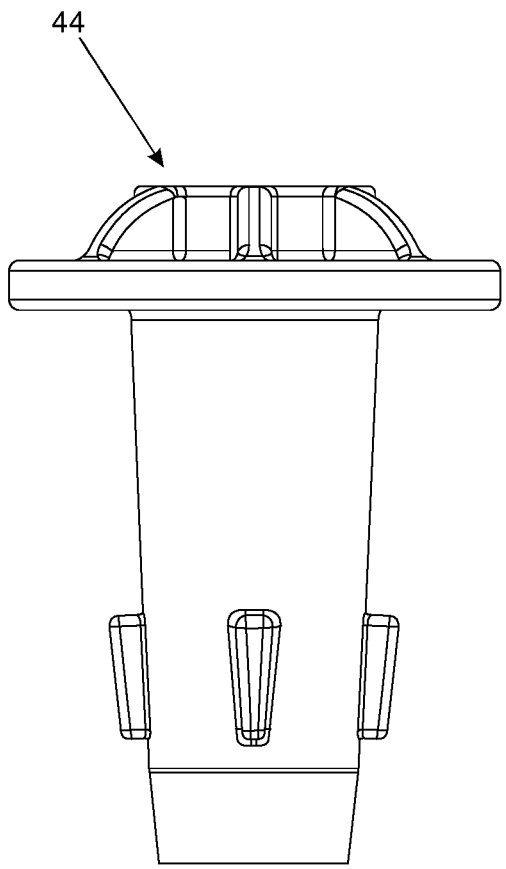
FIG. 5 is a side view of an alternate form of a multi-functional floating platform connector.
Figure 6:
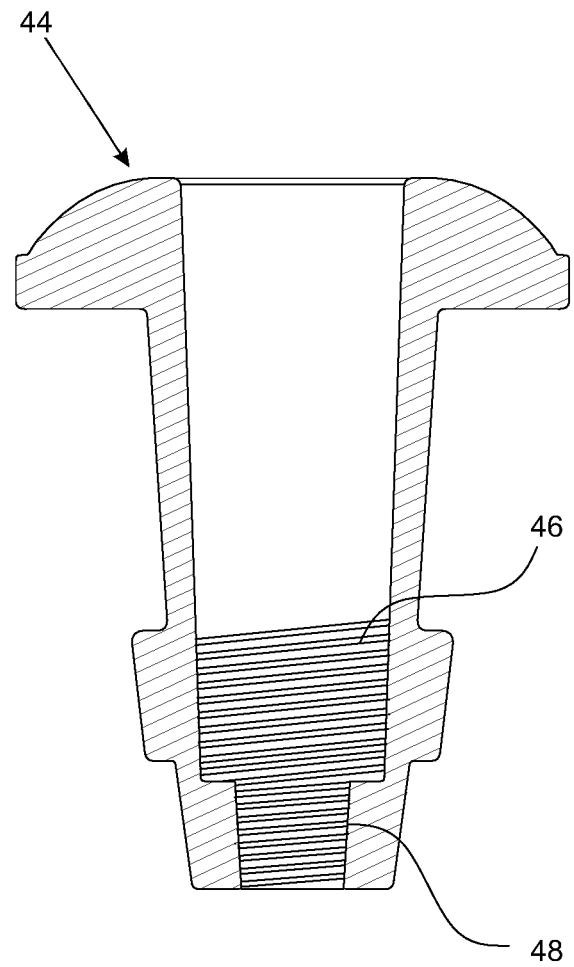
FIG. 6 is a cross-sectional view of the multi-functional floating platform connector depicted in FIG. 5 illustrating a centrally located hollow chamber with varying diameter walls that are threaded.

An alternative embodiment of the multi-functional floating platform connector is illustrated in FIGS. 5 and 6. FIG. 5 is a profile view of the alternative multi-functional floating platform connector 44, whereas FIG. 6 is a cross-sectional view of the alternative multi-functional floating platform connector 44 illustrating a larger diameter threaded wall section 46 and a smaller diameter threaded wall section 48.

Figure 4C:
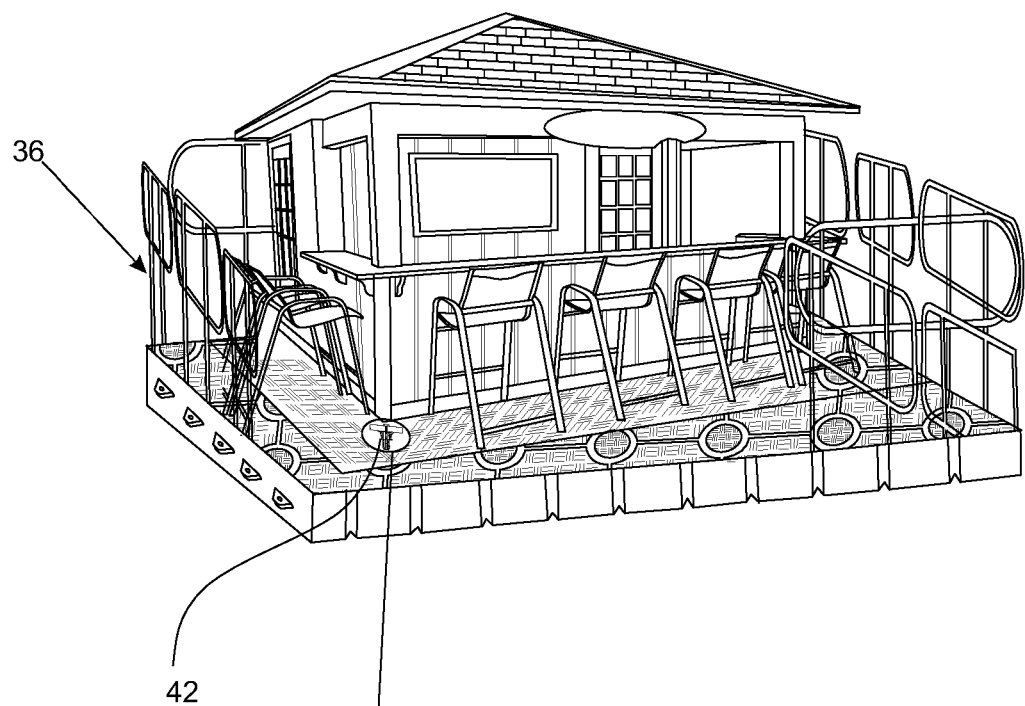
FIG. 4c is a perspective view of one example of a structure secured to a modular floating platform utilizing a multi-functional floating platform connector to secure a foundation for constructing the structure on top of a modular floating platform.
Figure 4D:
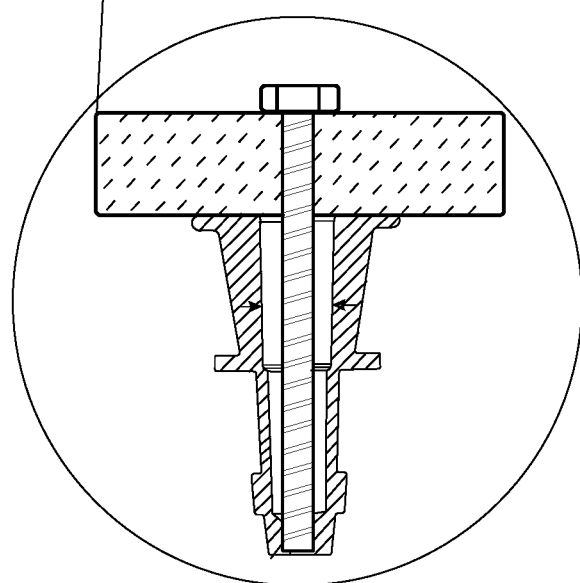
FIG. 4d is a schematic cross-sectional close-up view of the foundation in FIG. 4c secured to a multi-functional floating platform connector.
Figure 7:
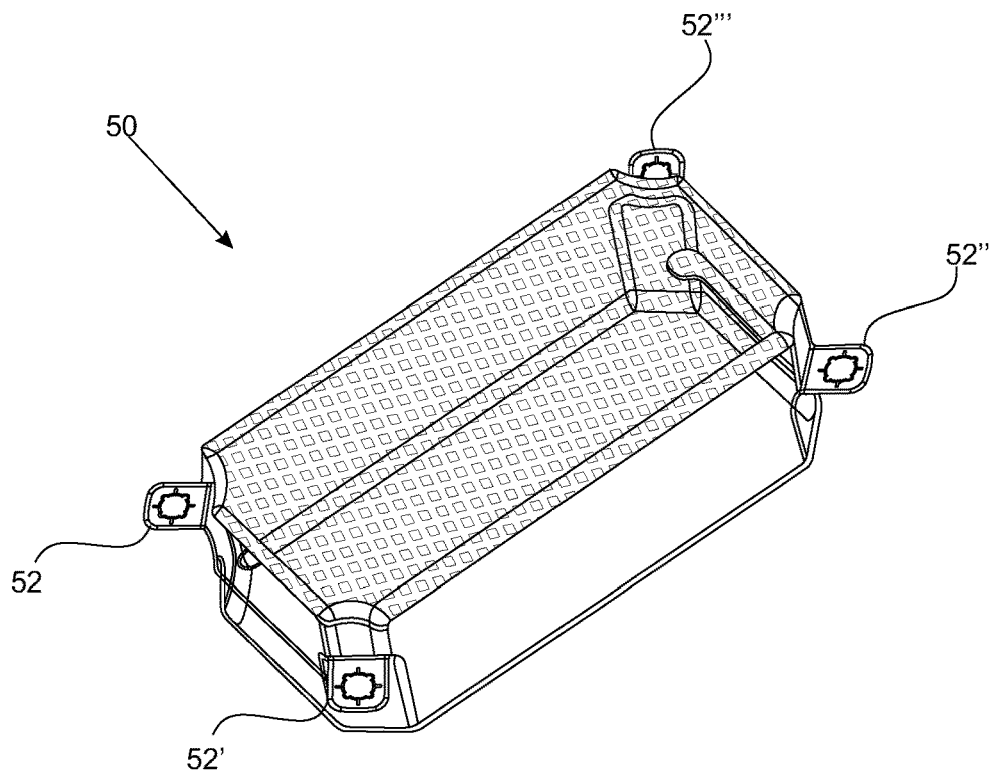
FIG. 7 is a perspective of one type of float module used in a modular floating platform including connecting tabs that project out from the corners of the float module.
Figure 8:
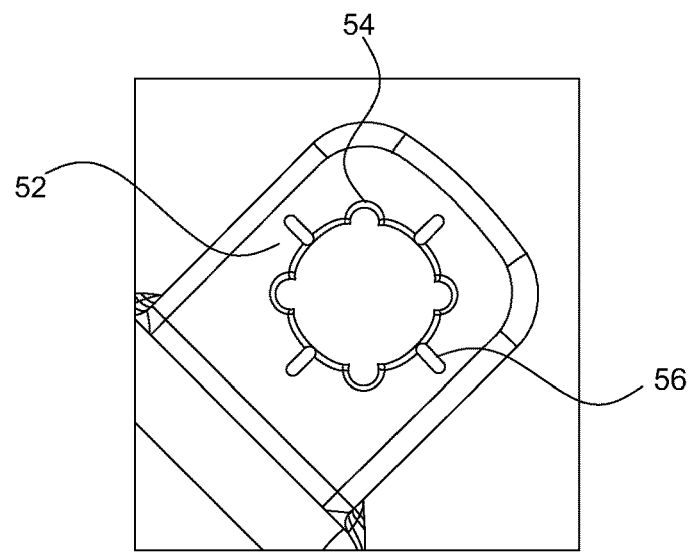
FIG. 8 is a bottom view of a connecting tab that projects from the corners of the floatation module depicted in FIG. 7.

FIG. 7 depicts a perspective view of one type of float module 50 that can be used to create a floating platform assembly such as those shown in FIGS. 4*a*, 4*b* and 4*c*. Float module 50 has connecting tabs 52, 52', 52", and 52''' projecting from each of the four corners of the float. In one embodiment, each of the tabs are disposed at a different elevation so that when adjacent float modules are brought together, the connecting tabs are stacked on top of one another to keep the adjoining float modules on a level plane. For example, tab 52 is in the lowest position followed by 52', 52" and 52''' respectively. The connecting tabs have slots 54 on the inside opening and grooves 56 on the bottom face of the connecting tabs as illustrated in FIG. 8.

Figure 9A:
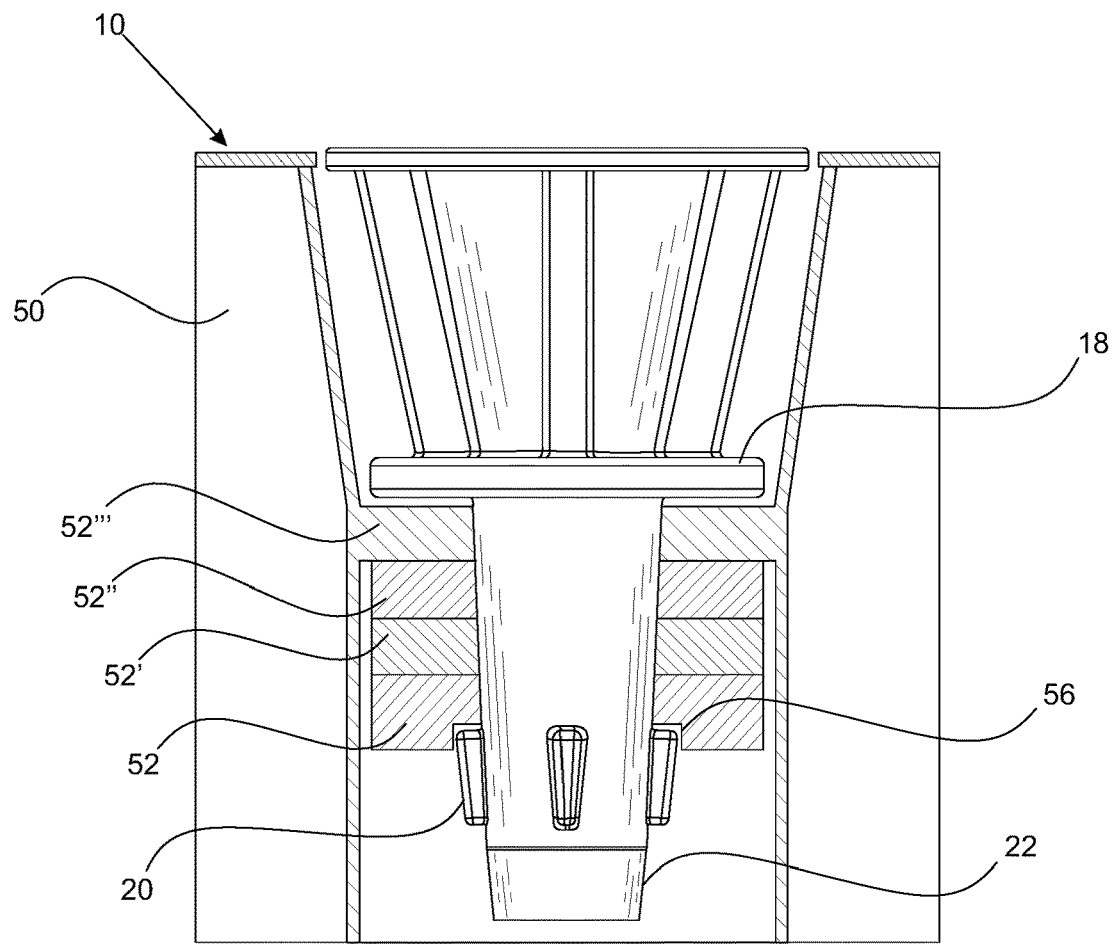
FIG. 9a is a cross section view of float modules and connecting tabs that are secured by a multi-functional floating platform connector.
Figure 9B:
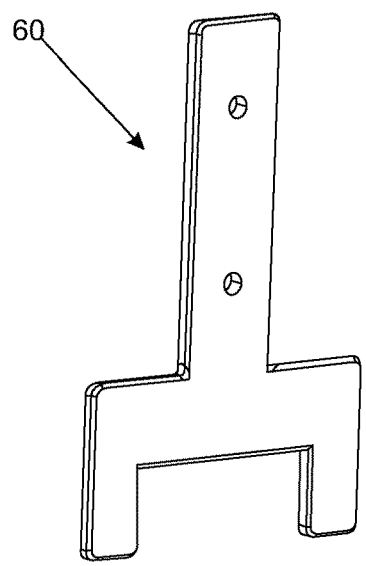
FIG. 9b is a perspective view of an assembly tool that can be used to secure a multi-functional connector into a modular floating platform assembly.

FIG. 9*a* is a cross-sectional view of a plurality of float modules illustrating how the connecting tabs 52, 52', 52", and 52''' are stacked up when the float modules are brought together to form a floating platform assembly. The slots 54 in each tab are aligned in the stack so that when the connector 10 is inserted into the tabs, the retaining ribs 20 of the connector 10 slide through the tabs so that the connector can be fully seated into the adjoining tabs of the float modules. The tapered tip of the 22 of the connector 10 allows the connector to easily pass through the openings in the connecting tabs. Once inserted into the tabs, the connector is then rotated (e.g., 45 degrees) using an assembly tool 60 like the one shown in FIG. 9*b*, which fit into the slots 14 in the head of the connector 10. When the connector 10 is rotated in the connecting tabs, a top of the retaining ribs 20 slide into the grooves 56 on the bottom of the lowest positioned tab 52, which thereby helps to retain the connector 10 in a locked position.

In the locked position, the collar 18 of the connector 10 rests on top of the highest positioned tab 52''' and together with the retaining ribs 20 hold the connecting tabs in a secured position and thereby creates a floating platform assembly that is firmly held together.

A floating platform assembly that is secured together with multi-purpose connectors as described herein provides a convenient and secure way to attach add-on accessories and other components without the need to find ways to secure directly into air tight float modules or otherwise add fastening or attachment points as a secondary step in the manufacturing process of producing modular floating platform modules. In one embodiment, the multi-purpose connector has an internal chamber with smooth inside walls of various diameters into which round attachment components such as tubes or pipes can be inserted. In one embodiment, the diameters of the chamber walls are tapered where the top section of the chamber walls are slightly larger than the diameter of the round attachment components being inserted and the bottom section of the chamber walls are and approximately the same diameter of the attachment component so that there is a tight fit between the chamber walls and the attachment components, which will help to hold the attachment components in place. In some embodiments, the chamber walls may be threaded, or the chamber may retain a threaded component, such as a threaded nut, in which case the threaded attachment component, such as a threaded pipe or rod or bolt can be retained. Other forms of attachment including a press fit connection can be utilized. Thus, it can be seen that users of multi-functional connectors for modular floating platforms will find them to be a valued addition that will expand the utility of the modular floating platforms and allow for easy and secure attachment of various accessories, fixtures and structures.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

What is claimed is:

1. A multi-functional connector for a modular floating platform, comprising:
   a connector body;
   a centrally located internal chamber positioned within the connector body, said chamber defining a top opening and having one or more selected wall diameters for receiving and retaining attachment members extending through the top opening, said top opening defining a diameter greater than or equal to at least one of the one or more selected wall diameters; and
   at least one external feature positioned on the connector body to hold the connector to the modular floating platform.

2. The multi-functional connector for modular floating platforms of claim 1 where at least one of the wall diameters of the chamber are threaded.

3. The multi-functional connector for modular floating platforms of claim 1 wherein at least two of the wall diameters of the chamber are threaded.

4. The multi-functional connector of claim 1, wherein the at least one external feature includes a collar.

5. The multi-functional connector of claim 1, wherein the at least one external feature includes retaining ribs.

6. The multi-functional connector of claim 1, wherein the at least one external feature includes a collar and retaining ribs.

7. The multi-functional connector for modular floating platforms of claim 1 wherein at least one of the wall sections of the chamber is adapted to receive and retain a threaded insert such as a nut.

8. The multi-functional connector for modular floating platforms of claim 1, further comprising a head including a plurality of slots positioned on opposite sides of the chamber configured to receive a tool for rotating the connector body.

9. A modular floating platform, comprising:
a plurality of float modules, each float module including a tab projecting from a main body of the corresponding float module; and
a connector extending through at least two tabs of adjacent float modules of the plurality of float modules, the connector defining a centrally located top opening and having an internal chamber for receiving an attachment member through the top opening, a diameter of the top opening being greater than or equal to a wall diameter of the internal chamber the connector further including at least one external feature to hold the connector to the adjacent float modules.

10. The modular floating platform of claim 9, wherein the plurality of float modules includes four float modules and the connector extends through four tabs, each tab connected to one of the plurality of float modules.

11. The modular floating platform of claim 9, further comprising a second connector, wherein the plurality of float modules includes a first set of adjacent float modules and a second set of adjacent float modules, the connector extending through tabs of the first set of adjacent float modules and the second connector extending through the second set of adjacent float modules.

12. The modular floating platform of claim 11, further comprising a structure supported by first and second attachment members, the first attachment member positioned within the connector and the second attachment member positioned within the second connector.

13. The modular floating platform of claim 9, further comprising an attachment member positioned within the connector.

14. The modular floating platform of claim 9, further comprising a fastener threaded into the connector and at least a portion of a structure positioned between a head of the fastener and a top surface of the connector.

15. The modular floating platform of claim 9, wherein the at least one external feature includes a collar.

16. The modular floating platform of claim 9, wherein the at least one external feature includes retaining ribs.

17. The modular floating platform of claim 16, wherein the retaining ribs are retained within grooves of a corresponding tab.

18. The modular floating platform of claim 9, wherein the connector includes a centrally located internal chamber, said chamber having one or more selected wall diameters for receiving and retaining attachment members.

19. The modular floating platform of claim 9, wherein the connector includes a tapered tip.

20. The modular floating platform of claim 9, wherein an upper surface of the connector is positioned at a similar height to an upper surface of the plurality of float modules.

21. The modular floating platform of claim 9, wherein the connector includes a centrally located internal chamber, said chamber having at least one of the wall sections of the chamber adapted to receive and retain a threaded insert such as a nut.

22. A method for securing mechanisms such as accessories, fixtures, structures and other apparatuses to modular floating dock structures comprising the steps of:
assembling a plurality of float modules;
connecting the plurality of float modules to each other by using connectors defining top openings and having centrally located hollow chambers for receiving and retaining attachment members through the top openings, the top openings having diameters being greater than or equal to corresponding wall diameters of the hollow chambers; and
securing mechanisms with attachment members to the floating dock structure by inserting one or more attachment members into the hollow chambered connectors.

23. The method of claim 22 where in the hollow chambers of the connectors have one or more tapered wall diameters and the step of inserting an attachment member into the hollow chamber to establish a press fit to securely retain the attachment member.

24. The method of claim 22 where the hollow chambers of the connectors have one or more threaded wall sections and the step of securing mechanism includes inserting and rotating a threaded attachment member into the hollow chamber to securely retain the attachment member.

25. The method of claim 22 where the hollow chambers of the connectors have one or more wall sections designed to receive and retain a threaded insert such as a nut and the step of inserting and rotating a threaded attachment member into the threaded insert to securely retain the attachment member.

* * * * *

UNITED STATES PATENT AND TRADEMARK OFFICE
CERTIFICATE OF CORRECTION

| | | |
|---|---|---|
| PATENT NO. | : 12,117,038 B2 | Page 1 of 1 |
| APPLICATION NO. | : 17/451433 | |
| DATED | : October 15, 2024 | |
| INVENTOR(S) | : Bruce Nelson | |

It is certified that error appears in the above-identified patent and that said Letters Patent is hereby corrected as shown below:

In the Claims

In Claim 9, at Column 5 at Line 29, delete "chamber" and insert -- chamber, --.

Signed and Sealed this
Twenty-fourth Day of December, 2024

Derrick Brent
*Acting Director of the United States Patent and Trademark Office*